United States Patent [19]

Kotzur

[11] Patent Number: 4,598,913
[45] Date of Patent: Jul. 8, 1986

[54] CENTRIFUGAL-TYPE SLIDE RING SEAL

[75] Inventor: Joachim Kotzur, Oberhausen, Fed. Rep. of Germany

[73] Assignee: M.A.N. Maschinenfabrik Augsburg-Nürnberg Aktiengesellschaft, Fed. Rep. of Germany

[21] Appl. No.: 717,701

[22] Filed: Mar. 29, 1985

[30] Foreign Application Priority Data

Nov. 13, 1984 [DE] Fed. Rep. of Germany ....... 3441351

[51] Int. Cl.$^4$ .......................... F16J 15/34; F16J 15/40
[52] U.S. Cl. .......................................... 277/3; 277/27; 277/29; 277/88
[58] Field of Search ................ 277/3, 27, 73, 82, 81 R, 277/85, 86, 88–90, 29

[56] References Cited

U.S. PATENT DOCUMENTS

| | | | |
|---|---|---|---|
| 2,646,999 | 7/1953 | Barske | 277/3 X |
| 2,903,970 | 9/1959 | Elovitz et al. | 277/3 X |
| 2,978,264 | 4/1961 | Campbell | 277/88 X |
| 3,090,654 | 5/1963 | Wald et al. | 277/3 X |
| 3,291,491 | 12/1966 | Smith | 277/27 |
| 3,375,014 | 3/1968 | Chubb et al. | 277/3 |
| 3,480,284 | 11/1969 | Voitik | 277/29 X |
| 3,506,276 | 4/1970 | Petersen et al. | 277/27 X |
| 4,071,253 | 1/1978 | Heinen et al. | 277/3 |
| 4,291,887 | 9/1981 | Frosch et al. | 277/27 |

FOREIGN PATENT DOCUMENTS

| | | | |
|---|---|---|---|
| 834930 | 3/1952 | Fed. Rep. of Germany. | |
| 877519 | 5/1953 | Fed. Rep. of Germany. | |
| 2072799 | 10/1981 | United Kingdom | 277/3 |

Primary Examiner—Robert S. Ward, Jr.
Attorney, Agent, or Firm—McGlew and Tuttle

[57] ABSTRACT

A liquid sealed shaft seal for a rotatable shaft comprises a housing disposed around the shaft and defining a seal chamber which can be supplied with sealing liquid. A seal disc is fixed to the shaft and extends into the chamber. An axially movable piston is mounted on the housing for axial movement toward and away from a side face of the seal disc. The piston is provided with a slide ring which engages the slide disc when the shaft is at a standstill and which, through a circumferentially induced increase in pressure for the sealing liquid in the chamber, is moved axially away from the disc when the shaft and disc rotate. A resilient bellows is connected between the piston and the housing for biasing the piston toward the disc.

21 Claims, 8 Drawing Figures

CENTRIFUGAL-TYPE SLIDE RING SEAL

FIELD AND BACKGROUND OF THE INVENTION

The present invention relates in general to shaft sealing and packing arrangements for accommodating a rotating shaft, and in particular to a new and useful liquid sealed shaft seal which utilizes an axially movable piston which moves into different positions depending on whether the shaft to be serviced by the shaft seal is rotating or not.

Seals of this kind are known under the designation centrifugal-type seal. In such seals, during the rotation of the shaft, a seal disc firmly secured to the shaft produces a pumping effect, namely increases the radial pressure in a stationary seal chamber surrounding the seal disc, of sealing liquid which is supplied to the chamber, so that a ring of rotating sealing liquid is formed at the rotating seal disc. The inner diameter of this rotating ring of sealing liquid, at either side of the rotating seal disc, adjusts to a radial level corresponding to the state of equilibrium between the outer space and inner space pressures of the seal. Such a seal is wear-free and without any significant leakage of sealing liquid into the inner space. At low speeds and at standstill of the shaft, however, the seal becomes ineffective since the needed centrifugal force is absent.

To overcome this drawback, centrifugal-type seals have been combined with floating seal rings, namely radially displaceable cylindrical bushings which are sealed against the housing and form with the shaft an axial sealing gap filled with sealing liquid. This, however, cannot prevent considerable leaks of sealing liquid to the inner space either, since a floating ring seal requires a certain excess pressure of the sealing liquid even at standstill or low speeds of the shaft, which excess pressure must be controllable from the outside because of the varying gas pressures.

Sealing liquid leakage, both at standstill and at any speed, can be reduced to insignificant amounts by means of so-called slide ring seals in which a seal disc firmly secured to the shaft is provided, and one or more slide rings are axially urged into contact with the disc by a resilient sealing element. Cooling and sealing is effected with a sealing liquid supplied between the slide rings. In spite of that, however, high temperatures occur in the extremely narrow sealing gap at high speeds, leading to a decomposition of the sealing liquid and destruction of the slide rings, thus making the packing ineffective.

SUMMARY OF THE INVENTION

The present invention is directed to a development of the seal of the above-mentioned kind, wherein leaks into the inner space under any operating conditions are minimized from a standstill condition up to highest speeds of the shaft, decomposition of the sealing liquid is prevented and wear is eliminated.

Accordingly, an object of the present invention is to provide a liquid sealed seal for a rotatable shaft comprising a housing disposed around the shaft with an outside space on one side thereof and an inside space on an opposite side thereof, both spaces surrounding the shaft, the housing having means defining a sealed chamber therein. A seal disc fixed to the shaft and extending into the sealed chamber, the disc having side faces, a piston mounted for axial movement to the housing toward and away from one of the disc side faces with the piston at least partly bounding the chamber. A slide ring is connected to the piston and engages the one disc side face in one axial position of the piston, and is spaced away from the one disc side face in another axial position of the piston. Resilient means are connected to the piston and preferably between the piston and the housing on the side of the piston opposite from the slide ring, for biasing the piston toward the disc side face. Means are also provided for supplying sealing liquid to the chamber and the chamber is shaped so that with rotation of the shaft pressure increases in the chamber which has the effect of axially moving the piston so that the slide ring comes out of contact with the disc side face.

Movement of the piston is usually obtained automatically, i.e. without an additional control from the outside. In particular instances, however, the axial force may additionally be controlled, for example by controlling the pressure of the sealing liquid in the chamber behind the axial piston, through discharge bores of this chamber.

To prevent the centrifugal force which is acting on the rotating sealing liquid, from affecting the supply pressure of the sealing liquid, it is advisable to supply the sealing liquid of the seal chamber through bores having as small a diameter as possible.

It may further be advantageous, as a safety against any failure of the sealing effect in the sealing chamber, to provide an additional sealing gap between the sealing liquid supply and the seal chamber, for example by means of a floating ring.

With high pressure differences between the outer and inner spaces, it is advisable to provide one or more floating rings between the seal chamber and the outer space. High sealing liquid pressures may thus be obtained in the seal chamber. At the same time, the sealing liquid flowing through the sealing gaps of the floating rings into the outer space, cools the seal chamber indirectly.

To obtain a compact structure and better compensate for the axial pressure load on the floating ring, the seal chamber may be formed in, and the slide ring, the axial piston, and the resilient element may form integral parts of a floating ring body by which a sealing gap between the seal chamber and the outer space is formed with the shaft.

According to a development of the invention, the axial piston, which is secured to the resilient element (such as bellows) slides in a cylindrical seal bushing which is radially displaceable in the machine housing.

This gives larger freedom of motion to the axial piston in the sealing gap region.

To better adapt to the varying pressures in the inner space and thus to the varying inside diameters of the rotating ring of sealing liquid, it may be advantageous to provide different diameters of the inside boundary of the seal chamber.

A compensation for the varying pressures in the inner space may also be obtained with a control of the radial pressure increase in the seal chamber, effected through elevations of projections such as pumping vanes, provided on one or both sides of the rotating seal disc.

Such a control may even be effected by means of axial projections or recesses provided on the rotary surface and in the opposite wall of the seal chamber.

To prevent the rotation from increasing the pressure of the sealing liquid in the chamber at the rear of the axial piston, ribs obstructing the rotation of the sealing liquid may be provided in the chamber.

In a manner known per se, the slide ring or rings may be made of a slide carbon material. Also in a manner known per se, the slide ring may produce a hydrostatic or hydrodynamic effect on the sealing gap as long as this gap is still sufficiently narrow.

A further object of the present invention is to provide a liquid sealed shaft packing which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, some embodiments of the invention are described with reference to the sectional views of the drawings in which.

DESCRIPTION OF THE PREFERRED EMBODIMENTS

Figure 1:
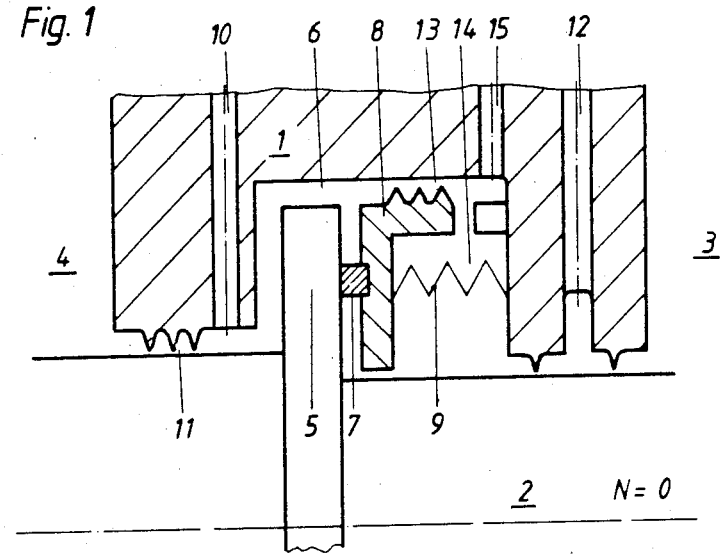
FIG. 1 shows an inventive liquid sealed shaft seal, with the shaft at a standstill.

Referring to the drawings in particular, the invention embodied therein comprises a liquid sealed shaft seal which establishes a seal around a shaft and separates an inside space around the shaft from an outside space around the shaft. In the various figures, the same reference numerals are utilized to designate the same or similar parts.

According to FIG. 1, a liquid sealed shaft seal is provided for sealing the zone where a shaft 2 extends through a machine housing 1 between an inner space 3 and an outer space 4. Rigidly mounted on shaft 2 is a seal disc 5. Seal disc 5 is surrounded on both radial sides and its axial circumference by a seal chamber 6. Further provided is an axial piston 8 which is under the biasing pressure of a resilient element 9, such as a bellows, and carries a slide ring 7. With the shaft at a standstill, slide ring 7 is pressed against seal disc 5. Sealing liquid is supplied through bores 10 into seal chamber 6. The sealing liquid fills up the seal chamber 6 between slide ring 7, and also fills a throttling gap 11 which is formed by housing 1 and shaft 2 between seal chamber 6 and outer space 4. N, the number rotary speed of shaft 2, equals zero in FIG. 1.

With the pressure of the sealing liquid in sealing chamber 6 exceeding that in the outer space 4, (the atmospheric pressure, for example), most of the sealing liquid flows from chamber 6 through throttling gap 11 to the outer space. A small excess pressure of the sealing liquid in sealing chamber 6 relative to the gas pressure in inner space 3 causes a small leak past slide ring 7 into discharge bore 12 of inner space 14, and discharge bores 15 are under the sealing liquid supply pressure, so that with shaft 2 at a standstill, no sealing liquid leaks that way.

Figure 2:
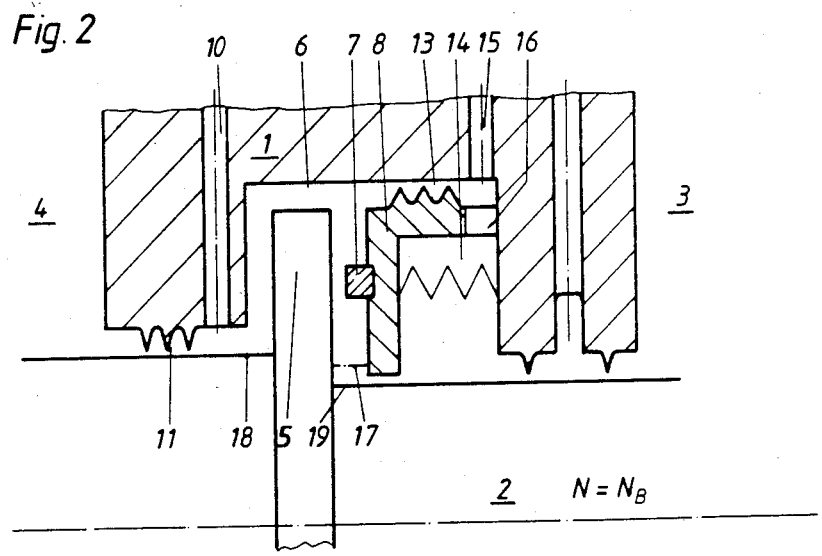
FIG. 2 is a view corresponding to FIG. 1, with the shaft in rotation.

According to FIG. 2, initially, piston chamber 14 is under the same sealing liquid pressure as discharge bore 15. Through supply bores 10, sealing liquid is supplied to seal chamber 6 with the same pressure as to discharge bore 12. Under a radial pressure increase in seal chamber 6 at a rotary speed $N_B$, axial piston 8 and thus slide ring 7 disengages from rotating seal disc 5 and applied against stops 16 provided on machine housing 1. A rotating ring of sealing liquid then extends from outer throttling gap 11 past slide ring 7 to an inner boundary 17 of a diameter which automatically varies with the differential pressure between the sealing liquid pressure and the gas pressure in inner space 3. With a sealing liquid pressure higher than the gas pressure, the diameter of boundary 17 is smaller than the shaft diameter 18 at the outer seal side. Therefore, if no additional protrusions are provided for seal disc 5 to enhance the radial sealing liquid pressure increase, a smaller shaft diameter 19 at the inside is necessary. During rotation, under the excess pressure caused by the centrifugal force, the sealing liquid flows through sealing gap 13 of axial piston 8 to discharge bore 15. Due to this circulation, the sealing liquid rotating in seal chamber 6 is cooled. No significant amount of sealing liquid leaks at boundary 17. With the same differential pressure as that at standstill about, the same amount of sealing liquid leaks through the outer sealing gap 11 to the outside 4.

Figure 3:
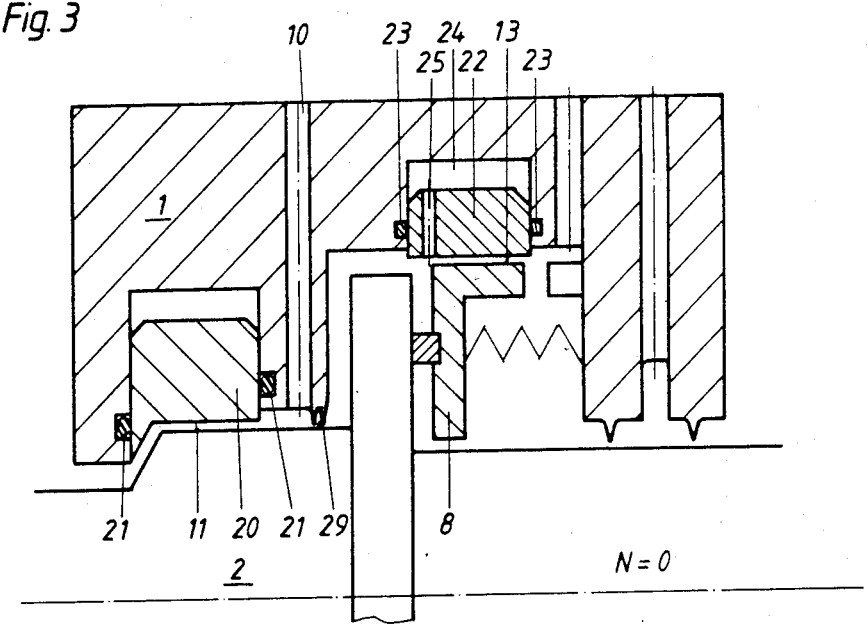
FIG. 3 shows a shaft seal with a radially displaceable seal bushing of the axial piston, and an outer throttling gap formed by a floating ring.

In FIG. 3, the outer sealing gap 11 is formed by shaft 2 and a floating ring 20 which is radially displaceable in machine housing 1 and sealed on its side by O-rings 21. An additional sealing gap 29 is provided between sealing liquid supply bore 10 and seal chamber 6. Further, in this embodiment, sealing gap 13 of axial piston 8 is limited outwardly by a cylindrical bushing 22 which is radially displaceable in machine housing 1 and sealed thereagainst by O-rings 23. To improve the radial mobility of the bushing, equilibration bores 25 are provided in the bushing through which the space around the bushing communicates with seal chamber 6.

Figure 4:
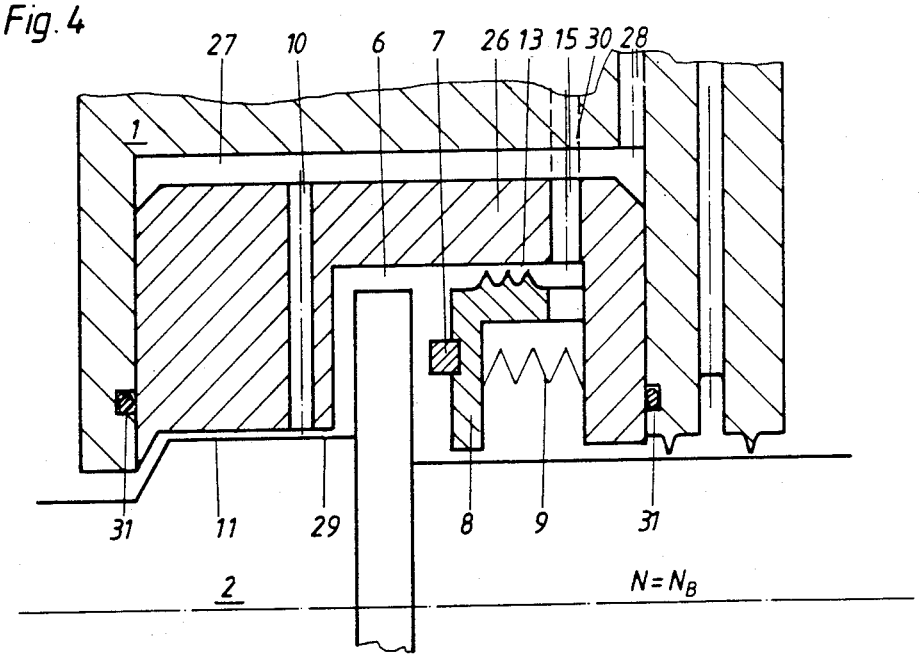
FIG. 4 shows a shaft seal integrated in a floating ring.

In FIG. 4 seal chamber 6 is provided inside a floating ring body 26, with which slide ring 7, axial piston 8 and bellows 9 form a constructional unit. Outer seal 11 is formed between this shaft 2 and floating body 26 which is surrounded by an external chamber 27. The sealing liquid is supplied into external chamber 27 through housing bores 28 and through bores 10 to an additional sealing gap 29 at seal chamber 6. Under the pressure which is radially increased by the centrifugal force, the sealing liquid flows through gap 13 and discharge bores 15 to external chamber 27 where the liquid that has been heated up by friction at the wall of seal chamber 6 mixes with freshly supplied sealing liquid and is partly recycled through bores 10 and gap 29 to seal chamber 6 and partly discharged through sealing gap 11 to the outside. However, the sealing liquid flowing through discharge bore 15 may also be returned directly through lines 30, to a sealing liquid supply unit (not shown). Leakage of sealing liquid between floating body 26 and machine housing 1 is prevented by O-rings 31.

Figure 5:
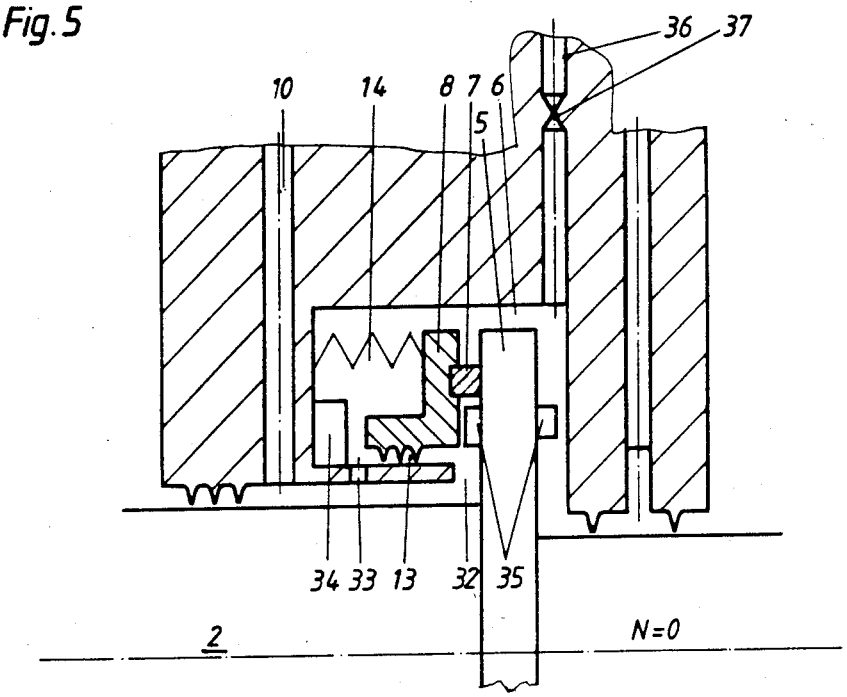
FIG. 5 shows a shaft seal designed with an axial piston inside, ribs in the chamber behind the axial piston, and pumping vanes on the rotary seal disc.

FIG. 5 shows an embodiment where sealing gap 13 is provided inside a cavity for axial piston 8. With shaft 2 at a standstill, only space 32 of seal chamber 6 up to slide ring 7 is filled with sealing liquid supplied through bores 10. With the shaft rotating, a small portion of the sealing liquid flows from inner space 32 through sealing gap 13 into piston chamber 14 which communicates through equilibrating bores 33 with the sealing liquid supply space. Radial ribs 34 provided in piston chamber 14 prevent the sealing liquid from rotating in this chamber. Pumping vanes 35 firmly secured to rotary seal disc 5 are to optimize the pressure distribution in the ring of sealing liquid during the shaft rotation. Through discharge bores accommodating fittings 37, a part of the sealing liquid can be discharged at the periphery of seal chamber 6, to be cooled and degassed.

Figure 6:
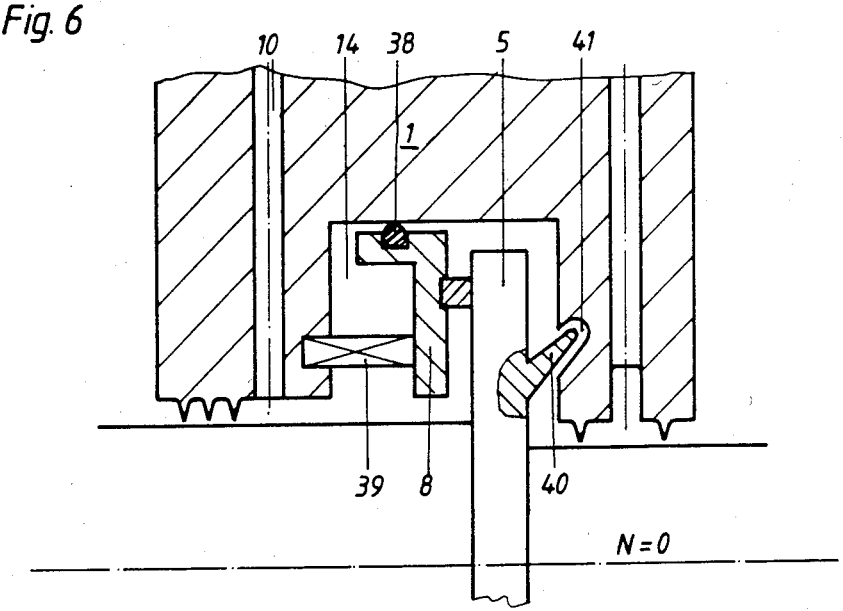
FIG. 6 shows a shaft seal with another design of the resilient, sealing and biasing element and with axial projections on the seal disc and recesses in the housing.

FIG. 6 shows the resilient sealing element exerting an axial force, embodied by a combination of an O-ring 38 and compression springs 39 which are distributed along the circumference of disc 5 and between which the sealing liquid supplied through bores 10 passes into piston chamber 14. To control the centrifugal force in the rotating ring of sealing liquid, seal disc 5 is provided with an annular axial projection 40, and machine housing 1 is provided with a corresponding annular recess 41.

Figure 7:
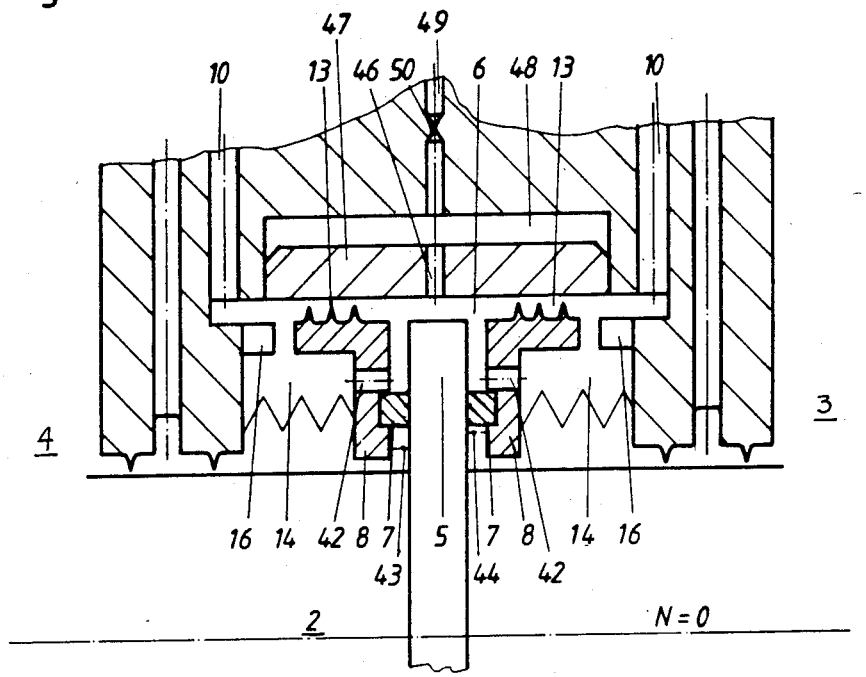
FIG. 7 shows a shaft seal comprising slide rings at both sides of the seal disc.

FIG. 7 shows an embodiment having a two-sided slide ring seal. This design requires an additional outer throttling gap. At standstill, the two slide rings 7 are pressed each into contact with one side of seal disc 5, so that the axial forces acting on the disc compensate each other. Sealing liquid is supplied to seal chamber 6 through supply bores 10, piston chamber 14 and bores 42. In the zone of its outer diameter, seal chamber 6 is filled with sealing liquid up to slide rings 7. A small amount leaks past slide rings 7 to the inner space 3 and outer space 4. With shaft 2 in rotation, the pressure of the sealing liquid in seal chamber 6 increases and urges the axial pistons back against stops 16. The inner boundaries of the rings of sealing liquid 43, 44 shift past slide rings 7 to smaller diameters which adjust in accordance with the gas pressures acting from the inside and outside. Due to the acting centrifugal force increasing the pressure in chamber 6 in the radial direction, the sealing liquid flows through bores 42 in axial pistons 8 into seal chamber 6 is partly returned through sealing gaps 13 into piston chamber 14 which are under the supply pressure. Another part of the liquid flows through bores 46 in cylindrical seal bushing 47, chamber 48, and conduits 49 with fittings 50, to a cooling unit (not shown).

Figure 8:
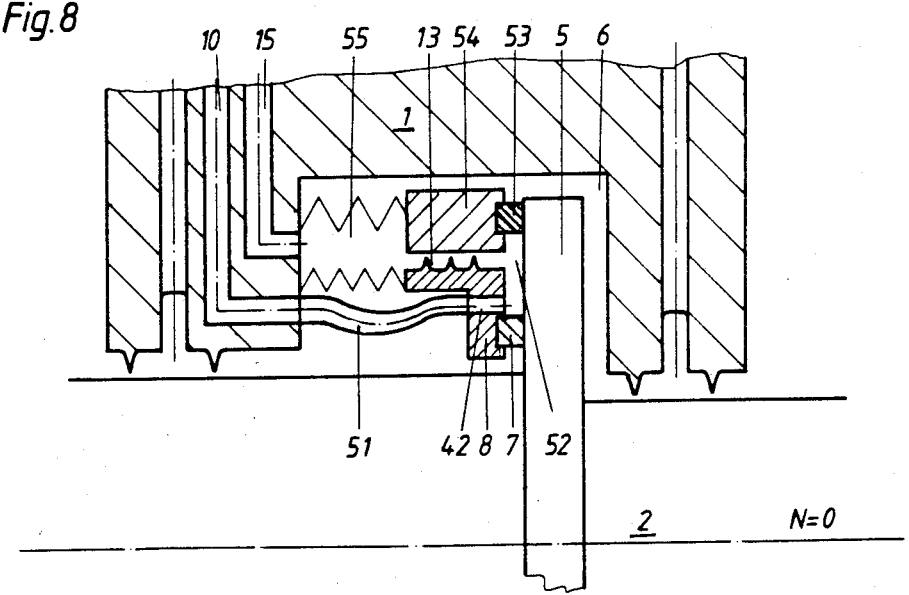
FIG. 8 shows a shaft seal with a unilateral mounting of two slide rings.

In the embodiment of FIG. 8, two slide rings 7 and 53 are urged unilaterally against seal disc 5, whereby overall axial length is saved. The sealing liquid is supplied through bores 10, flexible lines 51, and bores 42 to space 52 which is limited by disc 5, radially inner and radially outer slide rings 7 and 53, and axial pistons 8 and 54, respectively. Piston chamber 55 communicates through sealing gap 13 formed between axial pistons 8 and 54 with space 52. With shaft 2 in rotation, the pressure of sealing liquid in space 52 increases and pushes axial pistons 8, 54 with slide rings 7, 53 away from disc 5. Then, as in the embodiment of FIG. 7, rings of rotating sealing liquid form at either side of disc 5. Due to the increased pressure in space 52, a part of the sealing liquid supplied through bore 10 will return through sealing gap 13, chamber 55 and bores 15.

While specific embodiments of the invention have been shown and described in detail to illustrate the application of the principles of the invention, it will be understood that the invention may be embodied otherwise without departing from such principles.

What is claimed is:

1. A liquid sealing shaft seal for a rotatable shaft comprising a housing disposed around the shaft with an outside space on one side thereof and an inside space on an opposite side thereof, the shaft extending through the outside and inside spaces, said housing having means defining a seal chamber, a seal disc fixed to the shaft and extending into said seal chamber, said seal disc having side faces, a piston mounted for axial movement to said housing toward and away from one of said disc side faces, said piston at least partly bounding said chamber, at least one slide ring connected to said piston and engaged against said one disc side face in one axial position of said piston and spaced away from said one disc side face in another axial position of said piston, resilient means connected to said piston for biasing said piston toward said one disc side face and means for supplying sealing liquid to said seal chamber so that with rotation of the shaft, corresponding rotation of said seal disc causes a circumferentially induced pressure increase of sealing liquid in said seal chamber which moves said piston axially from its one axial position to its other axial position, said means for supplying sealing liquid comprising said housing including at least one supply bore opening into said seal chamber, at least one floating ring mounted for radial movement to said housing, said floating ring having a surface facing the shaft and defining with the shaft a sealing gap establishing communication between said seal chamber and said outer space.

2. A seal according to claim 1, wherein said seal chamber has an inner diameter portion and an outer diameter portion, said supply bore opening into said inner diameter portion, said housing defining with the shaft a sealing gap between said inner diameter portion and said outer diameter portion of said seal chamber.

3. A seal according to claim 1, wherein said means defining said seal chamber comprise said floating ring, said piston mounted for axial movement to said floating ring and said resilient means connected between said piston and said floating ring, an additional sealing gap defined between said floating ring and the shaft on a side of said bore opening opposite from said seal chamber for leakage of sealing liquid from said sealing chamber through said first mentioned sealing gap and said second sealing gap, said second sealing gap communicating with said outer space.

4. A seal according to claim 1, including a second floating ring mounted for radial movement to said housing and having a side at least partly bounding said seal chamber, said housing and the shaft defining a sealing gap therebetween which communicates said seal chamber inner diameter portion with said seal chamber outer diameter portion, said second floating ring disposed in said seal chamber outer diameter portion.

5. A seal according to claim 4, wherein said housing includes a floating ring chamber, said additional floating ring mounted for radial movement in said floating ring chamber and including a sealing liquid passage communicating said floating ring chamber with said sealing chamber.

6. A seal according to claim 2, wherein said housing and the shaft define a sealing gap therebetween which communicates said seal chamber inner diameter portion with said chamber outer diameter portion, said floating ring disposed in said seal chamber outer diameter portion.

7. A seal according to claim 6, wherein said floating ring comprises a bushing for mounting said piston for axial movement, said piston being disposed radially inwardly of said bushing.

8. A liquid sealed shaft seal for a rotatable shaft comprising a housing disposed around the shaft with an outside space on one side thereof and an inside space on an opposite side thereof, the shaft extending through the outside and inside spaces, said housing having means defining a seal chamber, a seal disc fixed to the shaft and extending into said seal chamber, said seal disc having side faces, a piston mounted for axial movement to said housing toward and away from one of said disc side faces, said piston at leat partly boundng said chamber, at leat one slide ring connected to said piston and engaged against said one disc side face in one axial position of said piston and spaced away from said one disc side face in another axial position of said piston, resilient means connected to said piston for biasing said piston toward said one disc side face and means for supplying sealing liquid to said seal chamber so that with rotation of the shaft, corresponding rotation of said seal disc causes a circumferentially induced pressure increase of sealing liquid in said seal chamber which moves said piston axially from its one axial position to its other axial position, said means for supplying sealing liquid comprising said housng including at least one supply bore opening into said seal chamber, the shaft having portions on opposite sides of said sealing disc whic have different diameters.

9. A seal according to claim 8, wherein the shaft includes a large diameter portion on one side of said seal disc communicating with said outer space and a small diameter portion on an opposite side of said seal disc communicating with said inner space.

10. A seal according to claim 9, wherein said piston is mounted for axial movement radially outwardly of and adjacent said small diameter portion of the shaft.

11. A liquid sealed shaft seal for a rotatable shaft comprising a housing disposed around the shaft with an outside space on one side thereof and an inside space on an opposite side thereof, the shaft extending through the outside and inside spaces, said housing having means defining a seal chamber, a seal disc fixed to the shaft and extending into said seal chamber, said seal disc having side faces, a piston mounted for axial movement to said housing toward and away from one of said disc side faces, said piston at least partly bounding said chamber, at least one slide ring connected to said piston and engaged against said one disc side face in one axial direction of said piston and spaced away from said one disc side face in another axial position of said piston, resilient means connected to said piston for biasing said piston toward said one disc side face and means for supplying sealing liquid to said seal chamber so that with rotation of the shaft, corresponding rotation of said seal disc causes a circumferentially induced pressure increase of sealing liquid in said seal chamber which moves said piston axially from its one axial position to its other axial position, said means for supplying sealing liquid comprising said housing including at least one supply bore opening into said seal chamber, said seal disc including projections projecting from at least one of said side faces thereof, said projections shaped to increase the circumferential induced produced pressure increase in said seal chamber with rotation of the shaft and corresponding rotation of said seal disc.

12. A liquid sealed shaft seal for a rotatable shaft comprising a housing disposed around the shaft with an outside space on one side thereof and an inside space on an opposite side thereof, the shaft extending through the outside and inside spaces, said housing having means defining a seal chamber, a seal disc fixed to the shaft and extending into said seal chamber, said seal disc having side faces, a piston mounted for axial movement to said housing toward and away from one of said disc side faces, said piston at least partly bounding said chamber, at least one slide ring connected to said piston and engaged against said one disc side face in one axial position of said piston and spaced away from said one disc side face in another axial position of said piston, resilient means connected to said piston for biasing said piston toward said one disc side face and means for supplying sealing liquid to said seal chamber so that with rotation of the shaft, corresponding rotation of said seal disc causes a circumferentially induced pressure increase of sealing liquid in said seal chamber which moves said piston axially from its one axial position to its other axial position, said means for supplying seal liquid comprising said housing including at least one supply bore opening into said seal chamber, said seal disc including one of an axial projection and an axial recess on at least one side face thereof, said housing including at least one of an axial recess and an axial projection for receiving said one of an axial projection and axial recess of said seal disc.

13. A liquid sealed shaft seal for a rotatable shaft comprising a housing disposed around the shaft with an outside space on one side thereof and an inside space on an opposite side thereof, the shaft extending through the outside and inside spaces, said housing having means defining a seal chamber, a seal disc fixed to the shaft and extending into said seal chamber, said seal disc having side faces, a piston mounted for axial movement to said housing toward and away from one of said disc side faces, said piston at least partly bounding said chamber, at least one slide ring connected to said piston and engaged against said one disc side face in one axial position of said piston and spaced away from said one disc side face in another axial position of said piston, resilient means connected to said piston for biasing said piston toward said one disc side face and means for supplying sealing liquid to said seal chamber so that with rotation of the shaft, corresponding rotation of said seal disc causes a circumferentially induced pressure increase of sealing liquid in said seal chamber which moves said piston axially from its one axial position to its other axial position, said means for supplying sealing liquid comprising said housing including at least one supply bore opening into said seal chamber, and said piston defining a radial sealing gap with said housing in said seal chamber, and a discharge bore in said housing communicating with said seal chamber adjacent said radial sealing gap for discharging sealing liquid which was supplied through said supply bore.

14. A seal according to claim 13, wherein said seal chamber has an inner diameter portion and an outer diameter portion, said supply bore opening into said inner diameter portion, said housing defining with the shaft a sealing gap between said inner diameter portion and said outer diameter portion of said seal chamber.

15. A seal according to claim 13, wherein the shaft includes a large diameter portion on one side of said seal disc communicating with said outer space and a small diameter portion on an opposite side of said seal disc communicating with said inner space.

16. A seal according to claim 13, wherein said resilient means comprises an enclosing resilient element connected between said piston and said housing and defining a piston chamber.

17. A seal according to claim 16, wherein said resilient member comprises a bellows.

18. A seal according to claim 16, including a plurality of fixed ribs connected to said housing and extending into said piston chamber for preventing rotation of sealing liquid in said piston chamber with rotation of the shaft and corresponding rotation of said seal disc.

19. A seal according to claim 13, wherein said at least one seal ring is made of slide carbon material.

20. A seal according to claim 13, including a second piston mounted for axial movement to said housing toward and away from the other one of said disc side faces, a second slide ring connected to said second piston for engaging said other disc side face and second resilient means connected to said second piston for biasing said second piston axially toward said other disc side face.

21. A seal according to claim 13, including a second piston mounted for axial movement to said housing toward and away from said one disc side face, a second slide ring connected to said second piston for engagement with said one disc side face and second resilient means connected to said second piston for biasing said second piston toward said one disc side face, said first mentioned and second resilient means defining a chamber therebetween and said first mentioned piston being radially spaced with respect to said second piston.

* * * * *